3,336,629
VARIABLE DISK CAPACITOR
Daijiro Matsui, Tokyo-to, Japan, assignor to Toko Kabushiki Kaisha, Tokyo-to, Japan, a joint-stock company of Japan
Filed Dec. 17, 1965, Ser. No. 514,592
Claims priority, application Japan, Feb. 8, 1965, 40/9,079
2 Claims. (Cl. 317—248)

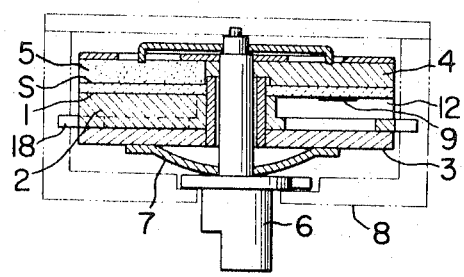
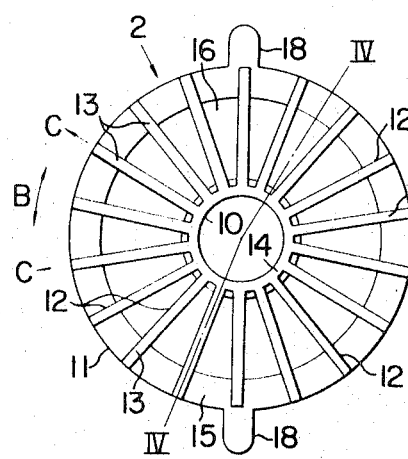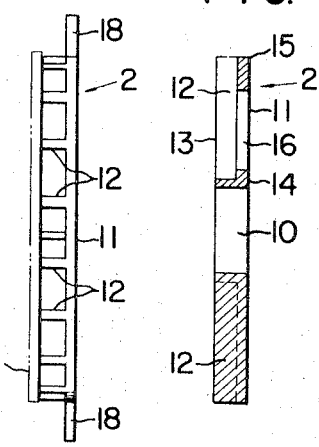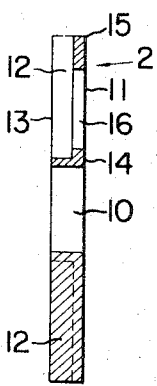
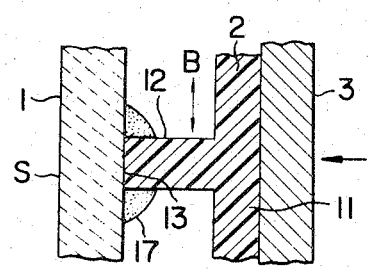

This invention relates to ceramic variable capacitors and more particularly to a new holder for supporting the ceramic plates of variable capacitors of the type in which a ceramic plate is used as a dielectric between the capacitor electrodes.

It is an object of the present invention to prevent deformation of the ceramic plate in a capacitor of the above stated type due to differences in the thermal expansions of the ceramic plate and the holder thereby to maintain a uniform gap between the electrodes and thereby to stabilize the variable capacitance of the capacitor.

According to the present invention, briefly stated, there is provided a ceramic plate holder for variable capacitors of the instant type, which ceramic plate holder is characterized by an integral structure consisting of a base plate made of a thermoplastic synthetic resin having a central through hole and a large number of ridge-shaped ribs extending radially from the through hole as the center and by the adhesive bonding of the ceramic plate of the capacitor to the ridge peak parts of the ribs whereby the ceramic plate and ribs are mutually locked in the rotor rotational direction but are mutually free to expand and contract in the longitudinal direction of the ribs.

The nature, principle, and details of the invention will be more clearly apparent from the following detailed description with respect to a preferred embodiment of the invention, when read in conjunction with the accompanying drawings in which like parts are designated by like reference numerals, and in which:

FIG. 1 is a side sectional view showing one example of a ceramic variable capacitor;

FIG. 2 is a planar view taken in the axial direction showing the embodiment of the ceramic plate holder according to the invention;

FIG. 3 is a side view as viewed from the right-hand side of FIG. 2;

FIG. 4 is a sectional view taken along the bent plane indicated by bent line IV—IV in FIG. 2; and FIG. 5 is a fragmentary, enlarged view in section showing the state of adhesive bonding of the ceramic plate to the holder.

Referring to FIG. 1, the example of a ceramic variable capacitor shown therein is provided with a ceramic plate 1, a holder 2 therefor, a support plate 3, a rotor electrode 4, a rotor support plate 5, a rotor shaft 6, a spring 7 for pressing together the rotor and stator, and a frame structure 8 for supporting the functional parts of the entire capacitor.

Of these parts, the ceramic plate 1, the holder 2, and the support plate 3 constitute the stator provided with a stator electrode 9 which is bonded to the reverse surface of the ceramic plate 1 (that is, the surface opposite to the sliding surface S thereof). Lugs 18 are formed on the periphery of the holder 2 and serve to lock the stator against rotation.

The present invention is concerned with the holder 2. According to the invention, as illustrated in FIGS. 2, 3, and 4, the holder 2 is characterized by an integral structure consisting of a base plate 11 made of a thermoplastic synthetic resin and having a central through hole 10 and a large number of ridge-shaped ribs 12 extending radially from the hole 10 as the center, and by the adhesive bonding of the ceramic plate 1 to the ridge peak surfaces 13 of the ribs 12 as described hereinafter.

Another and important feature of the holder 2 is that, in order to increase the elastic effect of the base plate 11, it is provided with void parts 16 between the ribs 12, a hub periphery 14 of the through hole 10 and an outer rim 15 being left as shown in FIGS. 2 and 4.

A further feature of the invention is the manner in which the ceramic plate 1 is secured by an adhesive 17 to each rib 12 as shown in FIG. 5. It is to be observed that, while the adhesive 17 adheres strongly to the ceramic plate 1, its adhesivity with respect to the rib 12 is poor since the rib is made of a thermoplastic synthetic resin. For this reason, the ceramic plate 1 and each rib 12 are securely fixed relative to each other in the rotor rotational direction (direction B in FIG. 5), but in the longitudinal direction of each rib 12 (direction of the arrow C in FIG. 2), there is relative freedom of individual movement between the ceramic plate 1 and the rib 12.

Accordingly, even if the ceramic plate 1 and the holder 2 are secured to each other, the holder 2 is free to elongate or contract in the radial direction (direction C). Therefore, the strain in or the deformation of the ceramic plate 1 arising from the difference between the thermal expansions of the ceramic plate 1 and the holder 2 is prevented. Accordingly, it is possible always to maintain uniformly the gap between the electrodes and thereby to overcome the problem of capacitance instability which has been a disadvantage of ceramic variable capacitors.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What I claim is:

1. In a ceramic variable capacitor of the type having a ceramic plate used as a dielectric between the capacitor electrodes, a ceramic plate holder comprising, as an integral structure, a base plate made of a thermoplastic synthetic resin and having a central through hole and a large number of ridge-shaped ribs extending radially from the center hole as the center, said ribs having straight ridge peaks, said ceramic plate being secured to said ridge peaks by an adhesive which adheres strongly to the ceramic plate but not to the ridge peaks, whereby the ceramic plate and the ribs are mutually free to expand and contract in the radial longitudinal direction of the ribs.

2. The ceramic plate holder according to claim 1 wherein the base plate is provided with void parts between the ribs and between a hub periphery of the center through hole leaving the base plate as the outer rim.

References Cited

UNITED STATES PATENTS 3,175,133   3/1965   Matsui _____ 317—249

LEWIS H. MYERS, *Primary Examiner.*

E. GOLDBERG, *Assistant Examiner.*